(12) United States Patent
Sugama

(10) Patent No.: US 9,874,700 B2
(45) Date of Patent: Jan. 23, 2018

(54) GRATING COUPLER AND OPTICAL WAVEGUIDE DEVICE

(71) Applicant: FUJITSU LIMITED, Kawasaki-shi, Kanagawa (JP)

(72) Inventor: Akio Sugama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/397,013

(22) Filed: Jan. 3, 2017

(65) Prior Publication Data

US 2017/0115456 A1    Apr. 27, 2017

Related U.S. Application Data

(63) Continuation of application No. PCT/JP2014/068188, filed on Jul. 8, 2014.

(51) Int. Cl.
    *G02B 6/34* (2006.01)
    *G02B 6/124* (2006.01)
    *G02B 6/30* (2006.01)

(52) U.S. Cl.
    CPC .............. *G02B 6/34* (2013.01); *G02B 6/124* (2013.01); *G02B 6/30* (2013.01)

(58) Field of Classification Search
    CPC ............. G02B 6/34; G02B 6/124; G02B 6/30
    See application file for complete search history.

(56) References Cited

U.S. PATENT DOCUMENTS

| 9,239,432 | B2 * | 1/2016 | Frish ................. G02B 6/34 |
| 2004/0258347 | A1 | 12/2004 | Gothoskar |
| 2013/0136396 | A1 | 5/2013 | Kim |

FOREIGN PATENT DOCUMENTS

| CN | 101995609 A | 3/2011 |
| JP | S62-296102 | 12/1987 |
| JP | H01-107214 | 4/1989 |
| JP | H06-082654 | 3/1994 |
| JP | H11-281831 | 10/1999 |
| JP | 2000-221349 | 8/2000 |
| JP | 2003-248128 A1 | 9/2003 |
| JP | 2007-525691 A1 | 9/2007 |
| JP | 2011-203603 A1 | 10/2011 |

OTHER PUBLICATIONS

International Search Report for International Application No. PCT/JP2014/068188 dated Mar. 3, 2015.

(Continued)

*Primary Examiner* — John M Bedtelyon
(74) *Attorney, Agent, or Firm* — Kratz, Quintos & Hanson, LLP

(57) ABSTRACT

The invention relates to a grating coupler and an optical waveguide device having a stripe width that can be easily realized where light is transferred by means of a beam of which the form is close to that of a Gaussian beam. A striped member that becomes a grating and that is formed of a material of which the refractive index is different from that of the core layer is divided into a plurality of sections, and at the same time, the distance between the core layer and the surface of the striped member on the side opposite the surface that faces the core layer is different for each section.

11 Claims, 20 Drawing Sheets

(56) References Cited

OTHER PUBLICATIONS

D. Taillaert, et al.; "Compact efficient broadband grating coupler for silicon-on-insulator waveguides;" Optics Letters; vol. 29; No. 23; Dec. 1, 2004; pp. 2749-2751 (3 Sheets)/p. 3 of specification.
C. Li, et al.; "CMOS-compatible high efficiency double-etched apodized waveguide grating coupler;" Optics Express; vol. 21; No. 7; Apr. 8, 2013; pp. 7968-7874 (7 Sheets).
Written Opinion of International Searching Authority for International Application PCT/JP2014/068188 dated Mar. 3, 2015 (6 Sheets, 7 Sheets translation, 13 Sheets total).

* cited by examiner

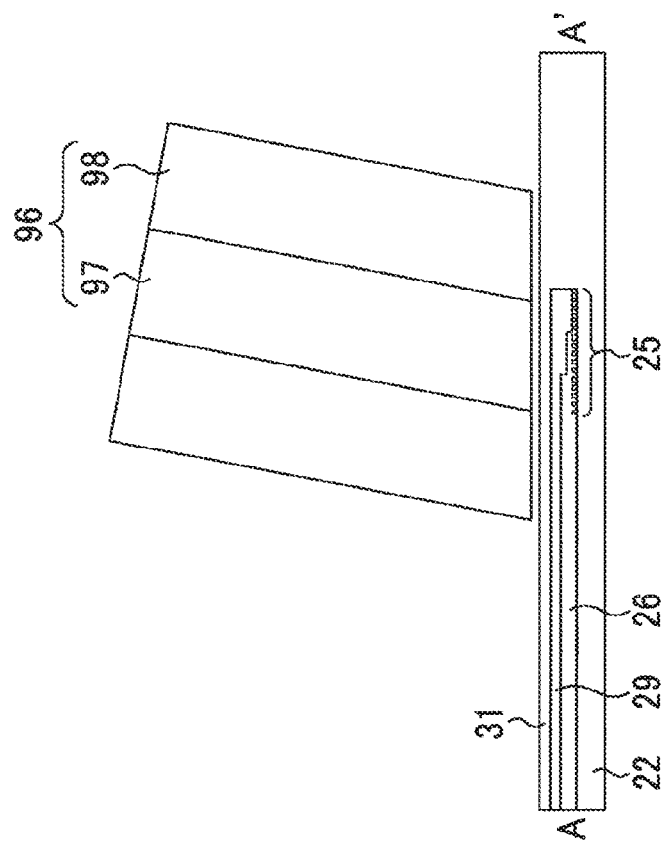
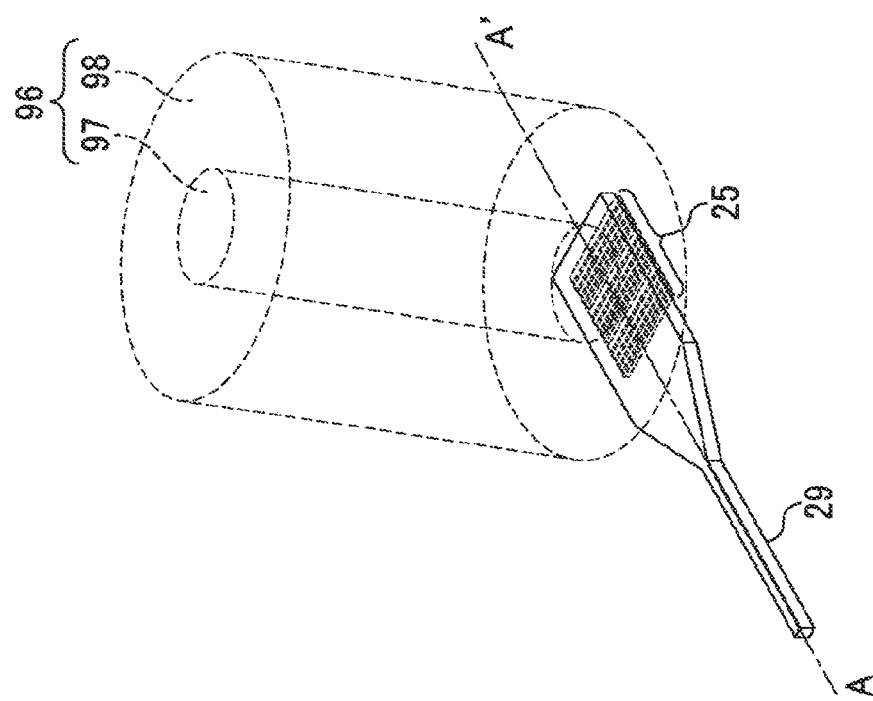
FIG. 4B
FIG. 4A

GRATING COUPLER AND OPTICAL WAVEGUIDE DEVICE

CROSS-REFERENCE TO RELATED APPLICATION

This application is a continuation application of International Application PCT/JP2014/068188 filed on Jul. 8, 2014 and designated the U.S., the entire contents of which are incorporated herein by reference.

FIELD

The present invention relates to a grating coupler and an optical waveguide device, and to a grating coupler that is connected to an optical fiber used in a device in an information communication system that requires signal transmission of a large capacity at a high speed, for example.

BACKGROUND

In conventional devices in information communication systems, a grating coupler that is provided along the optical waveguide is used in order to input signal light that has propagated through an optical fiber into an optical waveguide and guide the signal light through the optical waveguide. Here, an optical coupling structure using a conventional grating coupler is described in reference to FIGS. 19A and 19B.

FIGS. 19A and 19B are diagrams illustrating a conventional coupling state between an optical fiber and a grating coupler. FIG. 19A is a perspective diagram, and FIG. 19B is a cross-sectional diagram along the single-dotted chain line A-A' in FIG. 19A. The grating coupler has such a structure that light that is propagating through an optical waveguide 91 is radiated upward or downward from the grating (diffraction grating) 95 that is provided in a grating coupler unit 94 so that the optical waveguide 91 is coupled with an external optical fiber 96. Conversely, the grating coupler is also used for the coupling of light that propagates in the opposite direction, that is, from the optical fiber to the optical waveguide. Since this is a plane structure, it can be easily formed in accordance with a photolithographic technology, and in particular, this has become a mainstream optical fiber interface in silicon photonics. Here, 92, 93, 97 and 98 in FIGS. 19A and 19B are a lower clad layer, an upper clad layer, a core and a clad, respectively.

However, a coupling efficiency of 100% cannot theoretically be expected for grating couplers that have such a basic structure without any modifications. There are some reasons for this, and one of the main reasons is a mismatch in the form of the beam. FIG. 20 is a graph illustrating the form of a beam radiated from a grating coupler, and as shown in the graph, the optical fiber has a profile as that of a Gaussian beam. Meanwhile, the form of the beam radiated from the grating coupler has a profile in an exponential function form where light gradually attenuates.

This mismatch generates a loss of approximately 1 dB even in the best state. In addition, a further greater loss is generated when the state is shifted from the optimal state due to the manufacturing tolerance. This issue has been known for a long time, and a fundamental solution is to allow the grating coupler toradiatea Gaussian beam.

In order to convert the exponential function beam to a Gaussian beam, the coupling between the grating and the optical waveguide may be gradually intensified toward the end terminal of the grating coupler. A method for radiation a Gaussian beam by changing the line width of a grating has been proposed, for example (see Patent Literature 1 or Non-Patent Literature 1). As can be easily analogized from FIG. 20, however, a Gaussian beam cannot be radiated unless the portion with the highest light intensity is converted to the portion with the lowest light intensity. This means that a very fine line width is required.

CITATION LIST

Patent Literature

Patent Literature 1: Japanese Laid-open Patent Publication No. H01 (1989)-107214

Non-Patent Literature

Non-Patent Literature 1: D. Taillaert, et. al., "Compact efficient broadband grating coupler for silicon-on-insulator waveguides", Optics Letter, Vol. 29, p. 2749 (2004)

SUMMARY

Though the above-described proposals in Patent Literature 1 and Non-Patent Literature 1 are theoretically correct methods, the line width that can actually be realized is limited, and therefore, such a problem arises that only an incomplete Gaussian beam can be radiated.

One aspect of the disclosure provides a grating coupler, including:
 a substrate;
 a first clad layer provided on the substrate;
 a core layer provided on the first clad layer;
 a second clad layer provided on the core layer; and
 a grating provided between the core layer and either the first clad layer or the second clad layer, where a striped member is formed of a material of which the refractive index is different from that of the core layer is divided into a plurality of sections, the grating coupler being characterized in that the distance between the core layer and a surface of the striped member on the side opposite the surface that faces the core layer is different from among the sections.

Another aspect of the disclosure provides an optical waveguide device, which is characterized by including: a grating coupler as described in the above; an optical fiber that optically couples with the grating in an end portion of the grating coupler; and an optical waveguide that extends in the direction opposite the end portion of the grating coupler.

The disclosed grating coupler and optical waveguide device provide a stripe width that can be easily realized and make it possible to transfer light by means of a beam of which the form is close to that of a Gaussian beam.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B are diagrams illustrating the coupling state between the grating coupler and the optical fiber according to Example 1 of the present invention;

DESCRIPTION OF EMBODIMENTS

Figure 1A:
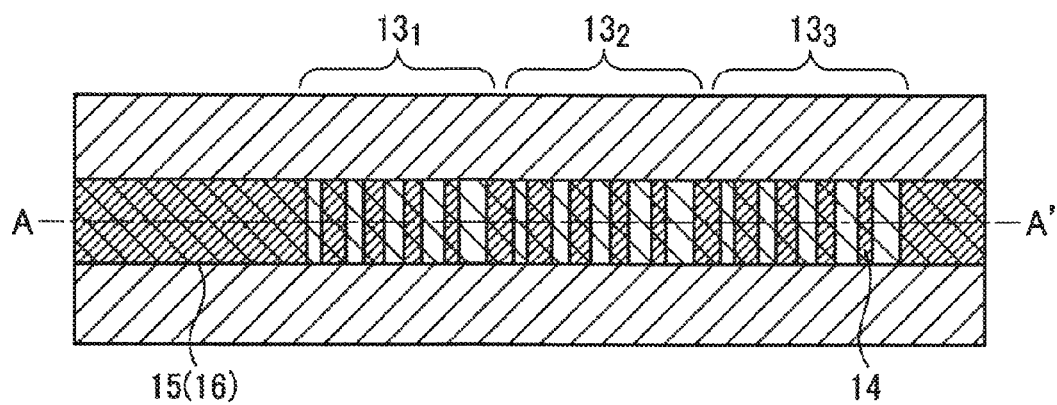
FIGS. 1A and 1B are diagrams illustrating a grating coupler according to an embodiment of the present invention.
Figure 1B:
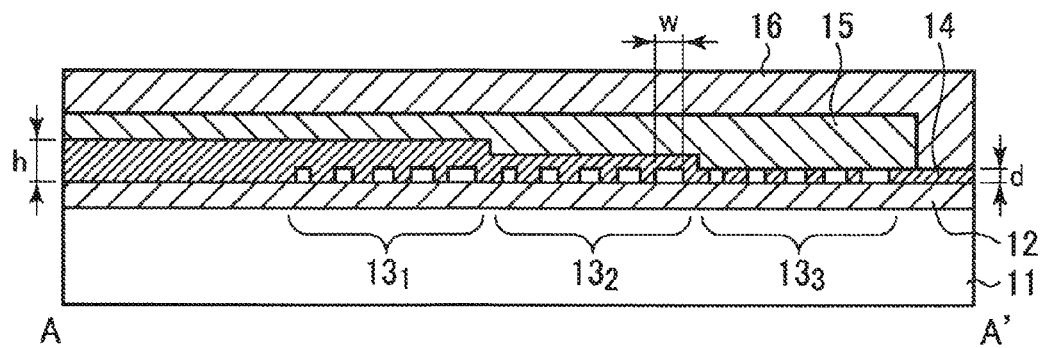

The grating coupler according to an embodiment of the present invention is described below in reference to FIGS. 1A, 1B and FIG. 2. FIGS. 1A and 1B are diagrams illustrating the grating coupler according to an embodiment of the present invention. FIG. 1A is a plan diagram, and FIG. 1B is a cross-sectional diagram along the single-dotted chain line A-A' in FIG. 1A. A grating coupler has a substrate 11, a first clad layer 12 provided on the substrate 11, a core layer 15 provided on the first clad layer 12, and a second clad layer 16 provided on the core layer 15.

In addition, a plurality of gratings $13_1$ through $13_3$ made of a striped member that is formed of a material of which the refractive index is different from that of the core layer 15 are provided between the core layer 15 and either the first clad layer 12 or the second clad layer 16.

Furthermore, the striped member is divided into a plurality of sections, and the distance h between the core layer 15 and the surface of the striped member on the side opposite the surface that faces the core layer 15 is different for each section. Moreover, a low refractive index layer 14 of which the refractive index is lower than that of the core layer 15 is provided between the core layer 15 and the striped member. The low refractive index layer 14 may be made of the same material as the first clad layer 12 and the second clad layer 16.

Typically, the number of stripes provided in each section is the same, which is more than one, and the distance h between the core layer 15 and the surface of the striped member on the side opposite the surface that faces the core layer 15 may decrease sequentially section by section as the location gets closer to the end portion of the grating coupler. In this case, the size w of the stripe in the direction in which light is guided in each section sequentially increases as the location gets closer to the end portion of the grating coupler.

In order to set this relationship, the surface of the core layer 15 that faces the striped member may be made a uniform flat surface, and the stripes may be provided at a different layer level in each section. Alternatively, the surface of the core layer 15 that faces the striped member may be a stepped surface where the thickness of the core layer 15 is different for each section, and all the stripes may be provided at the same layer level. In either case, the gratings $13_1$ through $13_3$ are usually provided between the core layer 15 and the first clad layer 12 from the point of view of easiness in the manufacturing process. However, the gratings $13_1$ through $13_3$ may be provided between the core layer 15 and the second clad layer 16.

Alternatively, the number of stripes provided in each section is the same, which is more than one, and the distance h between the core layer and the surface of the striped member on the side opposite the surface that faces the core layer 15 may increase sequentially in each section as the location gets closer to the end portion of the grating coupler. In this case, the size w of the stripes in the direction in which light is guided and the thickness d of the stripes in each section may increase sequentially as the location gets closer to the end portion of the grating coupler.

Here, two to four are the typical number of sections into which the striped member is divided. One stripe may be provided in each section, and the thickness d and the size w in the direction in which light is guided may be the same for all the stripes. In this case, the film forming process increases greatly though it is easy to design the characteristics.

Si, $Si_3N_4$, quartz glass, optical glass, resins and semiconductors can be used for the material of the gratings $13_1$ through $13_3$. The size in the case where the respective materials are used can be found in accordance with an FDTD method (finite-difference time-domain method) or the like. In addition, $SiO_2$ or SiON is used for the low refractive index layer. Furthermore, the substrate 11 may be a glass substrate, but it is desirable to use an SOI substrate from the point of view of compatibility with a silicon photonics technology.

One example can be cited such that the wavelength of propagating light is 1.55 μm, $SiO_2$ having a refractive index of 1.44 is used for the clad layers, SiON having a refractive index of 1.48 is used for the core layer having a thickness of 1 μm, and $Si_3N_4$ having a refractive index of 2.00 is used for the gratings. The number of sections is three, and the number of stripes in each section is seven (though it is five in the drawings for the convenience of illustration), the pitch between the stripes is 0.909 μm, and the entire length is approximately 20 μm. The width of the stripes is 40% to 60% of the pitch, and the thickness of the striped member is 0.25 μm. In addition, the distance between the top surface of the striped member and the bottom surface of the core layer 15 is 1.05 μm, 0.90 μm and 0.85 μm.

In the end portion of this grating coupler, an optical fiber is provided for optical coupling with the grating, and an optical waveguide is provided so as to extend in the direction opposite the end portion of the grating coupler, and thus, an optical waveguide device is gained.

Figure 2:
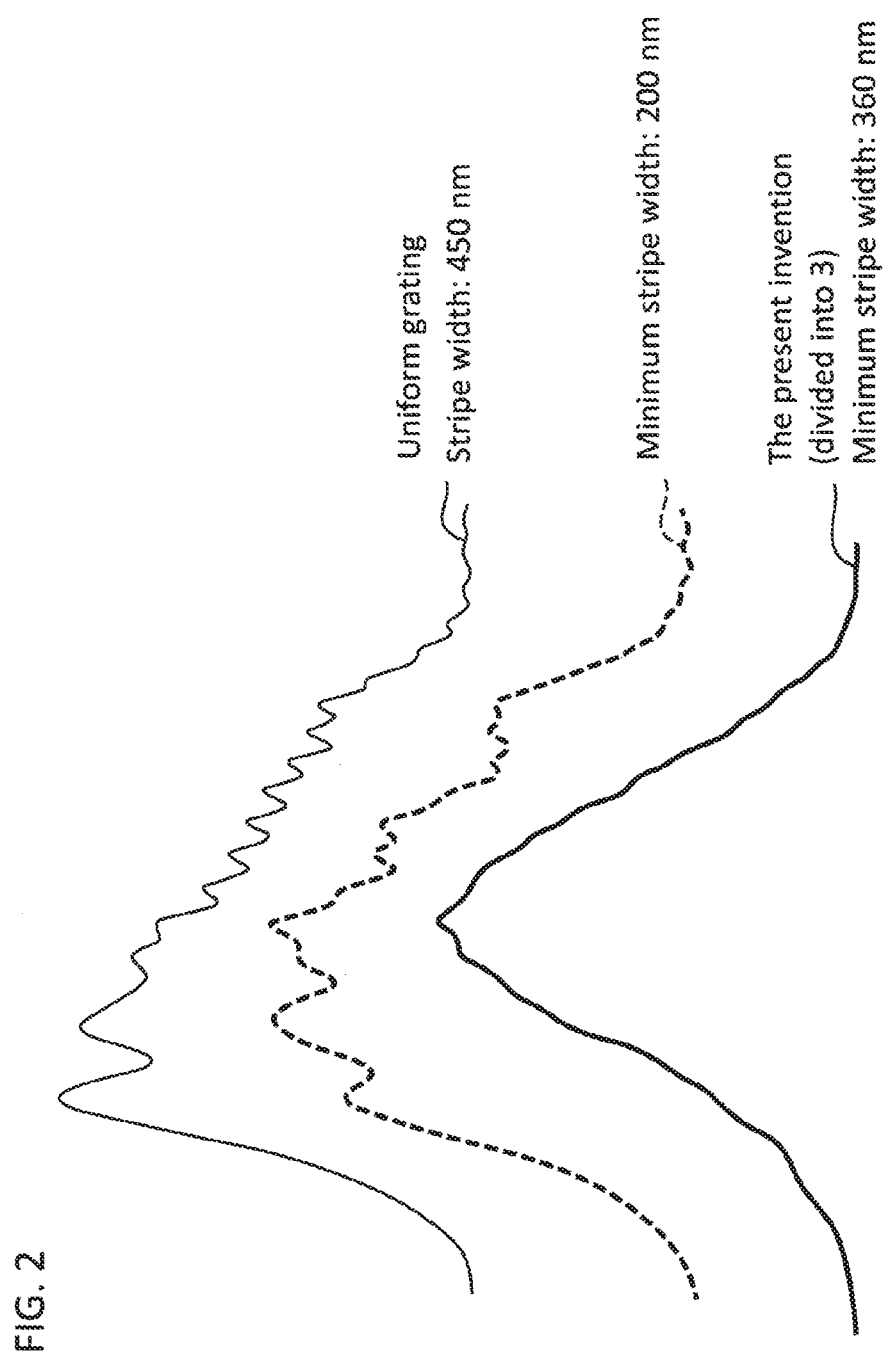
FIG. 2 is a graph illustrating the results of simulation of the form of a beam radiated from the grating coupler according to the embodiment of the present invention.

FIG. 2 is a graph illustrating the results of simulation of forms of beams radiated from the grating coupler according to the embodiment of the present invention. This graph illustrates all the forms of the beams radiated from a conventional uniform grating coupler where the stripe width is 450 nm and a grating coupler where the stripe width increases sequentially starting from 200 nm, as proposed in Patent Literature 1 and Non-Patent Literature 1. Here, the grating coupler according to the present invention has three sections where the minimum stripe width is 360 nm for the simulation.

The form of the beam radiated from the conventional uniform grating coupler having a stripe width of 450 nm is exponential, while the form of the beam radiated from the grating coupler according to the present invention is close to the form of a Gaussian beam. The grating coupler according to the present invention can be compared to the grating coupler proposed in Patent Literature 1 or Non-Patent Literature 1 having a minimum stripe width of 200 nm to find that an almost ideal Gaussian beam can be gained in spite of the fact that the minimum stripe width is 360 nm. This size, 360 nm, can be implemented in an i-line stepper, and thus, an ideal grating coupler can be realized without needing to select a certain exposure equipment.

According to the present invention, the coupling between the grating and the core is adjusted by changing the distance between the grating and the core, and therefore, a grating coupler that can radiate a Gaussian beam can be gained using a line width that can be actually formed. Furthermore, the width of the stripes in the grating can be changed in the sections in addition to the above so that the efficiency can be further increased.

EXAMPLE 1

Figure 3:
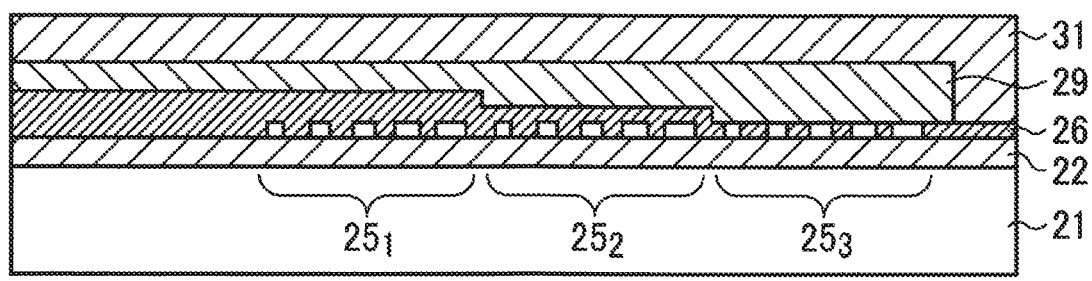
FIG. 3 is a diagram illustrating a grating coupler according to Example 1 of the present invention.

Next, the grating coupler according to Example 1 of the present invention is described in reference to FIGS. 3 through 8L. FIG. 3 is a diagram illustrating the grating coupler according to Example 1 of the present invention, where gratings $25_1$ through $25_3$ made of a single crystal Si layer that is divided into three sections are provided on a single crystal Si substrate 21 with a BOX layer 22 that becomes a lower clad layer in between. A low refractive index layer 26 made of an $SiO_2$ film is provided so as to cover the gratings $25_1$ through $25_3$, and the thickness of the cover is changed for each section of the gratings $25_1$ through $25_3$ so that the diffraction intensity gradually increases towards the terminal of the grating coupler. A core layer 29 made of an SiON film is provided on the low refractive index layer 26 and patterned to a predetermined form after the surface thereof has been flattened, and then is covered with an upper clad layer 31 made of an $SiO_2$ film.

FIGS. 4A and 4B are diagrams illustrating the coupling state between the grating coupler according to Example 1 of the present invention and an optical fiber. FIG. 4A is a perspective diagram, and FIG. 4B is a cross-sectional diagram along the single-dotted chain line A-A' in FIG. 4A. The grating coupler radiates light that is propagating through the optical waveguide upward from the gratings $25_1$ through $25_3$, and thus guides the light into an external optical fiber 96.

Figure 5A:
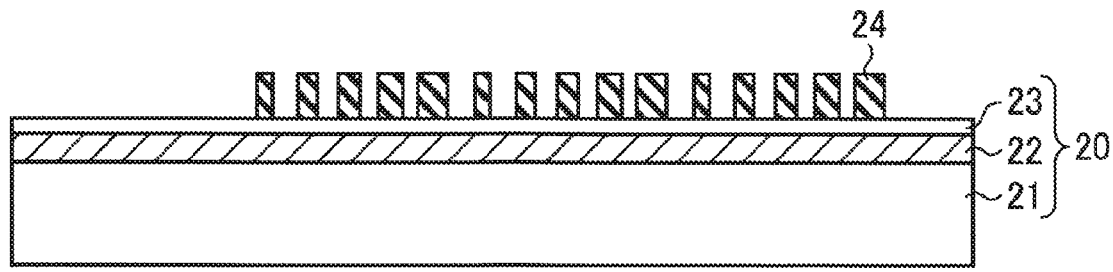
FIGS. 5A through 5C are diagrams illustrating the grating coupler according to Example 1 of the present invention up to a certain step during the manufacturing process.

Next, the manufacturing process for the grating coupler according to Example 1 of the present invention is described in reference to FIGS. 5A through 8L. First, as illustrated in FIG. 5A, an SOI substrate 20 is prepared, where a single crystal Si layer 23 having a thickness of 0.1 μm to 0.5 μm is provided on a single crystal Si substrate 21 with a BOX layer 22 that becomes a lower clad layer in between. A patterned resist 24 that is patterned in stripes is provided on the single crystal Si layer 23 in such a manner that three sets of seven stripes correspond to the sections, respectively, and the width of the stripes sequentially becomes wider toward the end portion in each set. Here, the figure shows only five stripes per set for the convenience of the illustration.

Figure 5B:
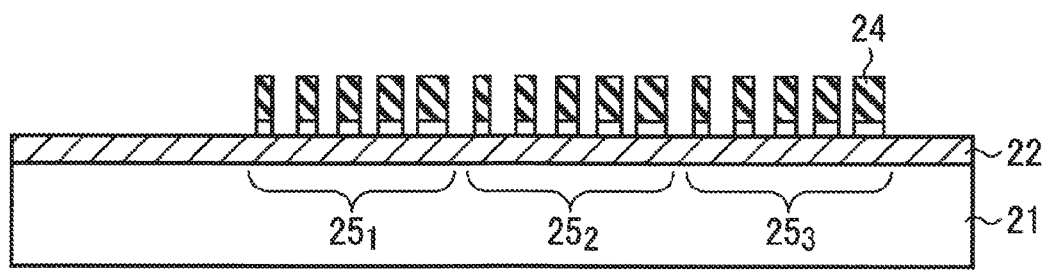
Figure 5C:
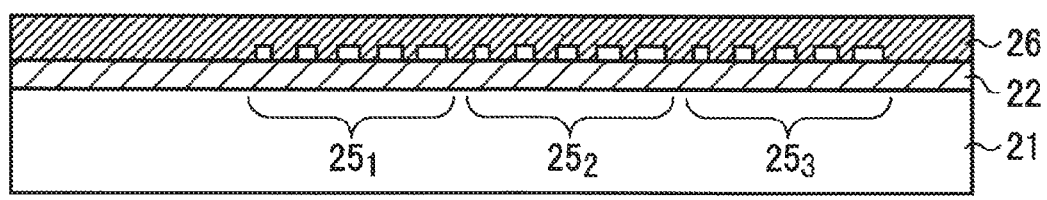

Next, as illustrated in FIG. 5B, the patterned resist 24 is used as a mask to dry etch the single crystal Si layer 23 so as to form gratings $25_1$ through $25_3$. Subsequently, as illustrated in FIG. 5C, the patterned resist 24 is removed, and then, a low refractive index layer 26 made of an $SiO_2$ film is provided so as to cover the gratings $25_1$ through $25_3$. At this time, flattening is carried out in accordance with a CMP (chemical mechanical polishing) method so that the film thickness becomes 0.5 μm to 2 μm above the gratings $25_1$ through $25_3$.

Figure 6D:
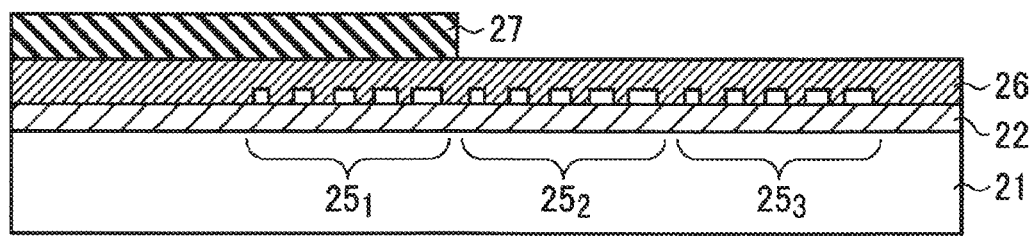
FIGS. 6D through 6F are diagrams illustrating the grating coupler according to Example 1 of the present invention up to a certain step after the step in FIG. 5C during the manufacturing process.
Figure 6E:
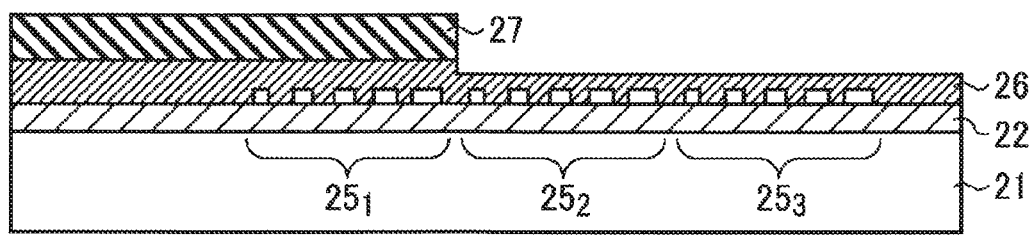

Next, as illustrated in FIG. 6D, a patterned resist 27 is provided so as to cover the grating $25_1$. Subsequently, as illustrated in FIG. 6E, the low refractive index layer 26 is dry etched so that the thickness thereof becomes approximately half.

Figure 6F:
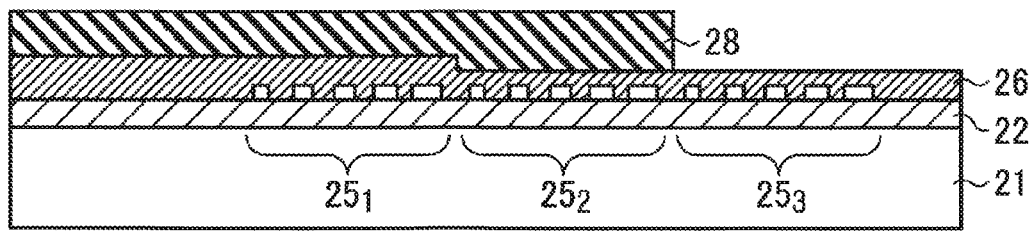
Figure 7G:
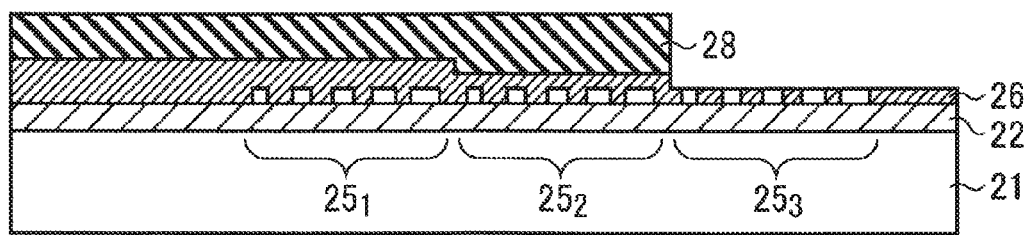
FIGS. 7G through 7I are diagrams illustrating the grating coupler according to Example 1 of the present invention up to a certain step after the step in FIG. 6F during the manufacturing process.
Figure 7H:
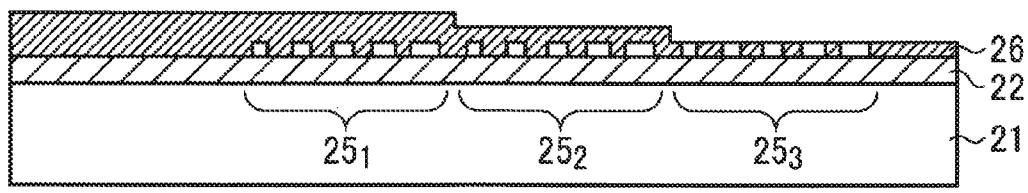

Next, as illustrated in FIG. 6F, a patterned resist 28 is provided so as to cover the gratings $25_1$ and $25_2$ after the patterned resist 27 has been removed. Subsequently, as illustrated in FIG. 7G, the low refractive index layer 26 is dry etched. Though the grating $25_3$ is exposed in the figure, the low refractive index layer 26 may remain covering the grating $25_3$. Next, as illustrated in FIG. 7H, the patterned resist 28 is removed so that the gratings $25_1$ through $25_3$ that are covered with the low refractive index layer 26 in a stepped form are gained.

Figure 7I:
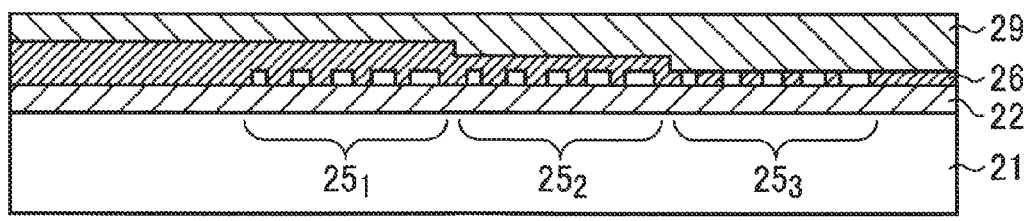
Figure 8J:
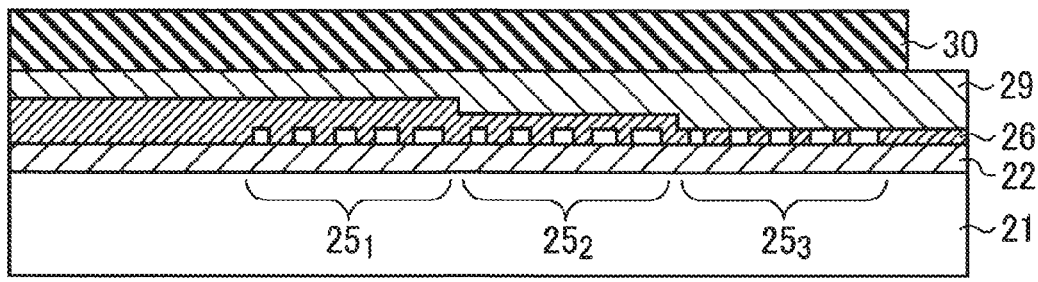
FIGS. 8J through 8L are diagrams illustrating the grating coupler according to Example 1 of the present invention in the steps after the step in FIG. 7I during the manufacturing process.

Next, as illustrated in FIG. 7I, an SiON film, which is a core material, is deposited and then flattened through polishing in accordance with a CMP method so that the thickness becomes 1 μm above the grating $25_1$, and thus, a core layer 29 is formed. Subsequently, as illustrated in FIG. 8J, a patterned resist 30 that is patterned in a core form is formed.

Figure 8K:
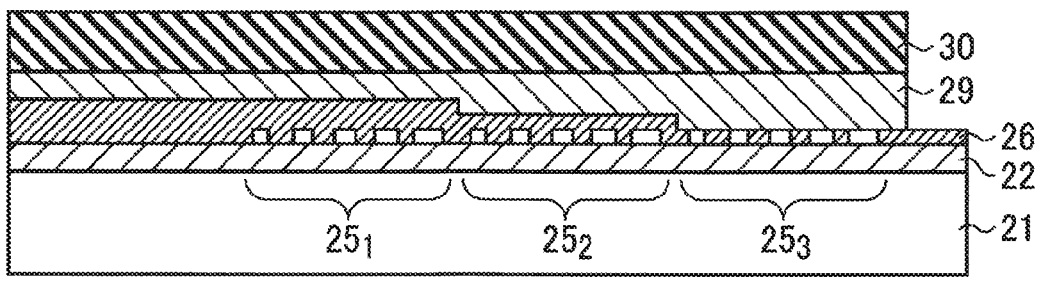
Figure 8L:
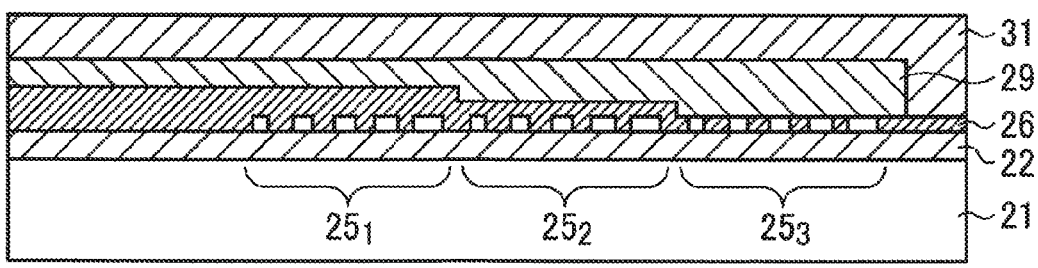

Next, as illustrated in FIG. 8K, the patterned resist 30 is used as a mask to pattern the core layer 29 in a predetermined form. Subsequently, as illustrated in FIG. 8L, the patterned resist 30 is removed, and then, an $SiO_2$ film is deposited on the entirety of the surface, and after that, polishing for flattening is carried out so as to provide an upper clad layer 31, and thus, the basic structure of the grating coupler according to Example 1 of the present invention is complete.

The application of the present invention makes it easy to implement a grating coupler that radiates a Gaussian beam. In particular, a Gaussian beam with high precision can be gained even when using general purpose exposure equipment with regards to precision or resolution. As a result, highly efficient coupling with an optical fiber can be expected, and a high performance optical waveguide device can be implemented. In addition, the single crystal Si layer in an SOI substrate is used as the grating layer, and therefore, a film forming process for the grating layer is unnecessary, and only one film forming process is necessary for the low refractive index layer, which makes the manufacturing process simple.

EXAMPLE 2

Figure 9:
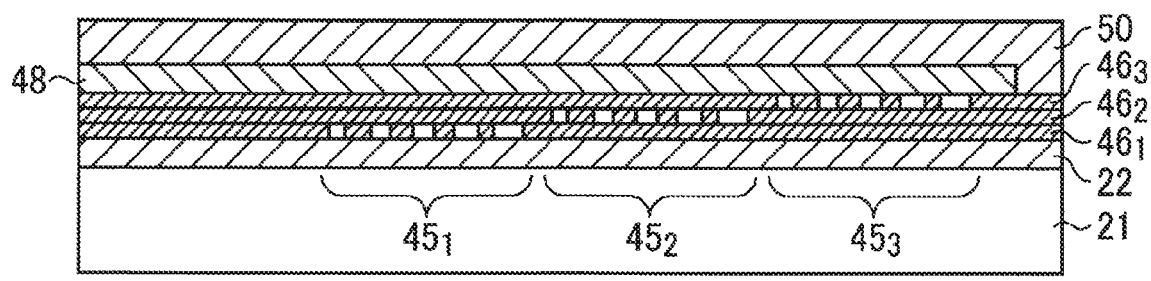
FIG. 9 is a diagram illustrating a grating coupler according to Example 2 of the present invention.

Next, the grating coupler according to Example 2 of the present invention is described in reference to FIGS. 9 through 14L. FIG. 9 is a diagram illustrating the grating coupler according to Example 2 of the present invention, where gratings $45_1$ through $45_3$ made of a single crystal Si layer, a polycrystalline Si layer or an $Si_3N_4$ layer that is divided into three sections are provided on a single crystal Si substrate 41 with a BOX layer 42 that becomes a lower clad layer in between. The gratings $45_1$ through $45_3$ are at different levels for each section due to the insertion of low refractive index layers $46_1$ through $46_3$ made of $SiO_2$ films in such a manner that the distance between the core layer 48 and the bottom of the gratings $45_1$ through $45_3$ gradually decreases as the location gets closer to the terminal of the grating coupler so that the diffraction intensity gradually increases. A core layer 48 made of an SiON film is provided on the low refractive index layer $46_3$ and patterned to a predetermined form after the surface thereof has been flattened, and then is covered with an upper clad layer 50 made of an $SiO_2$ film.

Figure 10A:
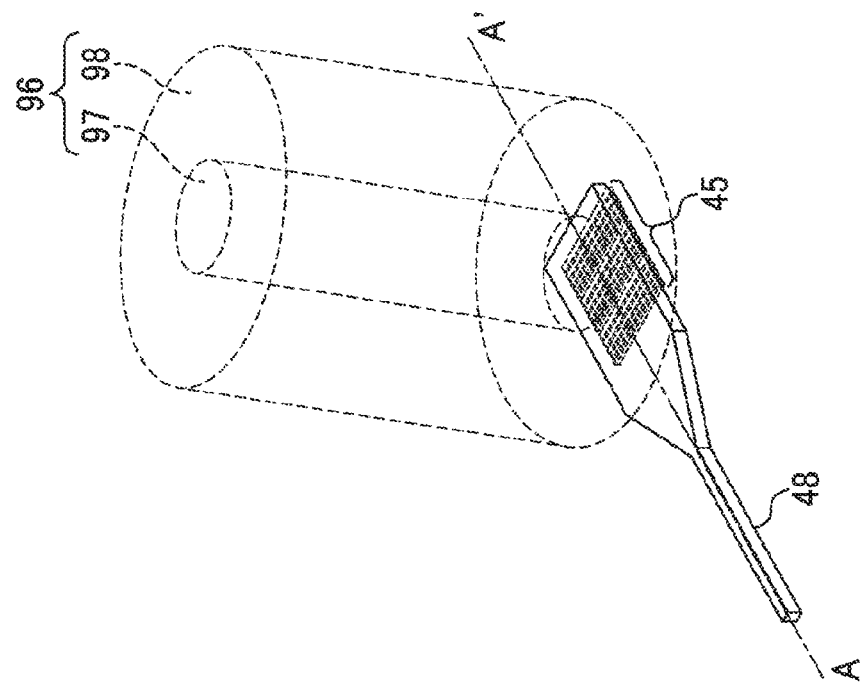
FIGS. 10A and 10B are diagrams illustrating the coupling state between the grating coupler and the optical fiber according to Example 2 of the present invention.
Figure 10B:
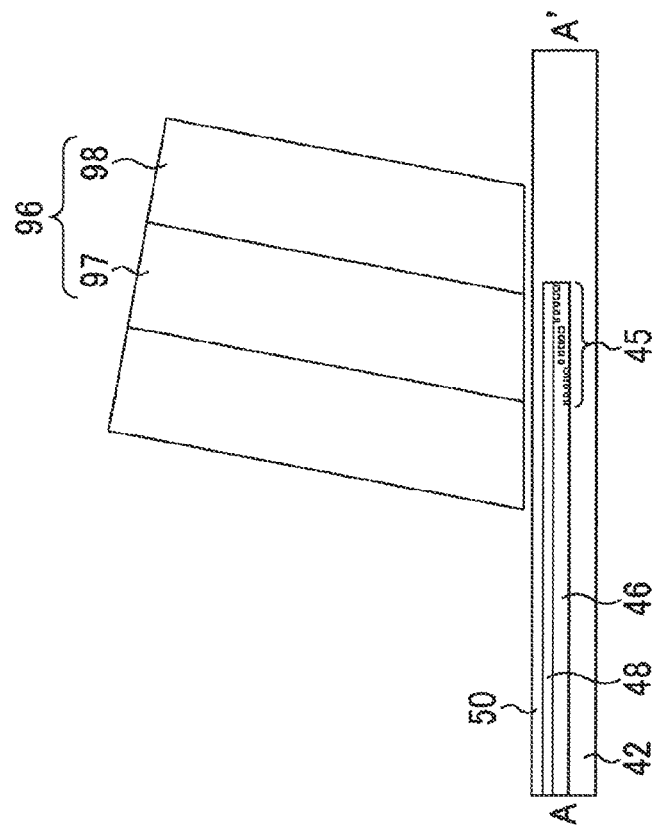

FIGS. 10A and 10B are diagrams illustrating the coupling state between the grating coupler according to Example 2 of the present invention and an optical fiber. FIG. 10A is a perspective diagram, and FIG. 10B is a cross-sectional diagram along the single-dotted chain line A-A' in FIG. 10A. The grating coupler radiates light that is propagating through the optical waveguide upward from the gratings $45_1$ through $45_3$ that are in the respective sections and at three different levels, and thus guides the light into an external optical fiber 96.

Figure 11A:
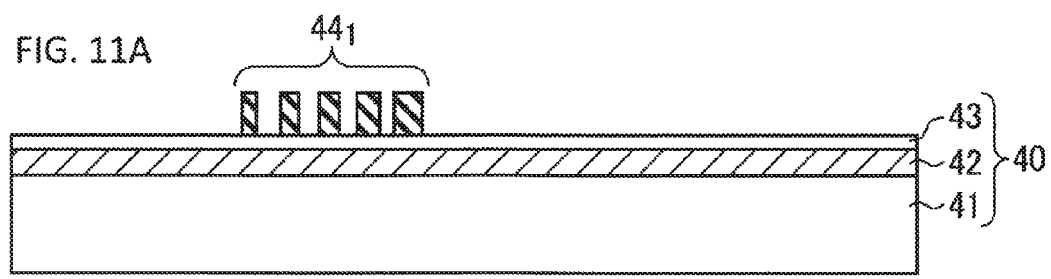
FIGS. 11A through 11C are diagrams illustrating the grating coupler according to Example 2 of the present invention up to a certain step during the manufacturing process.

Next, the manufacturing process for the grating coupler according to Example 2 of the present invention is described in reference to FIGS. 11A through 14L. First, as illustrated in FIG. 11A, an SOI substrate 40 is prepared, where a single crystal Si layer 43 having a thickness of 0.1 μm to 0.5 μm is provided on a single crystal Si substrate 41 with a BOX layer 42 that becomes a lower clad layer in between. A patterned resist $44_1$ that is patterned in stripes is provided on the single crystal Si layer 43 in such a manner that a set of seven stripes correspond to the first section, and the width of the stripes sequentially becomes wider toward the end portion in each set. Here, the figure shows only five stripes for the convenience of the illustration.

Figure 11B:
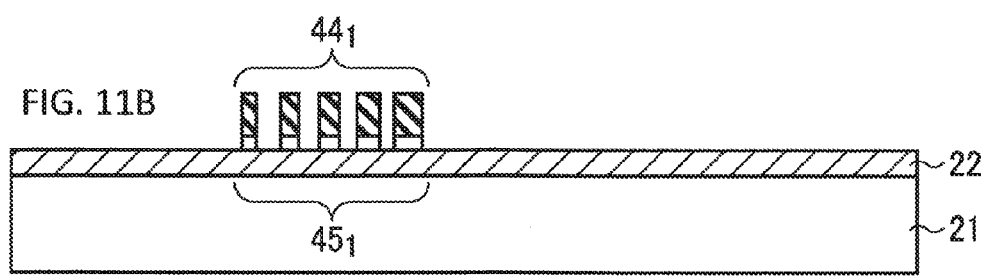
Figure 11C:
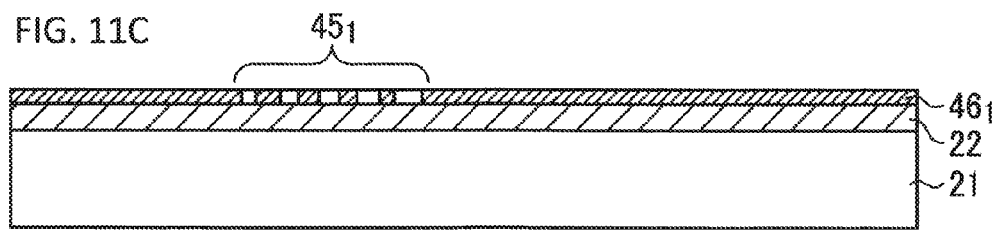

Next, as illustrated in FIG. 11B, the patterned resist $44_1$ is used as a mask to dry etch the single crystal Si layer 43 so as to form a grating $45_1$ in the first section. Subsequently, as illustrated in FIG. 11C, the patterned resist $44_1$ is removed, and then, a low refractive index layer $46_1$ made of an $SiO_2$ film is provided so as to cover the grating $45_1$. Next, flattening is carried out in accordance with a CMP method. Though the top of the grating $45_1$ is exposed in the figure, the low refractive index layer $46_1$ may remain covering the top.

Figure 12D:
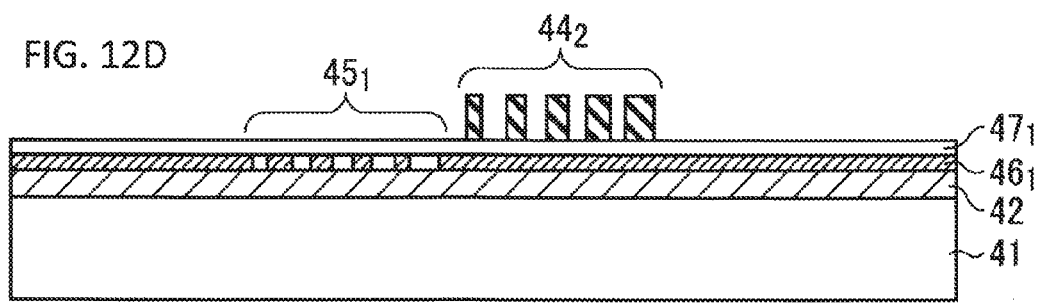
FIGS. 12D through 12F are diagrams illustrating the grating coupler according to Example 2 of the present invention up to a certain step after the step in FIG. 11C during the manufacturing process.
Figure 12E:
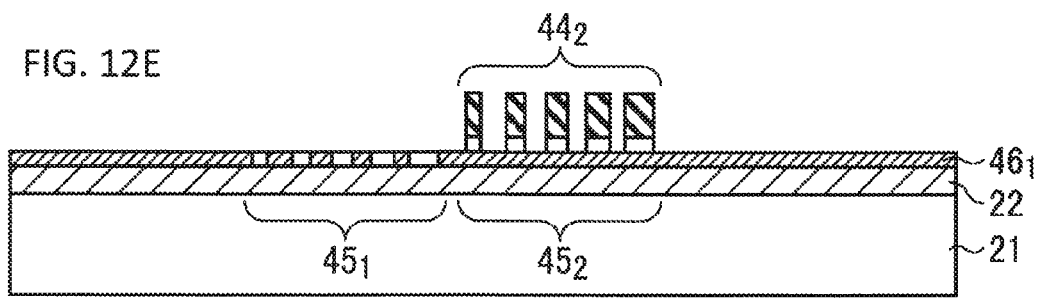

Next, as illustrated in FIG. 12D, a polycrystalline Si layer $47_1$ having a thickness of 0.1 μm to 0.5 μm is deposited so as to cover the grating $45_1$, and after that, a patterned resist $44_2$ for another set is provided so as to correspond to the second section. Here, the patterned resist $44_2$ is located in a place different from the patterned resist $44_1$ but has the same pattern as the patterned resist $44_1$. Subsequently, as illustrated in FIG. 12E, the patterned resist $44_2$ is used as a mask for dry etching so as to form a grating $45_2$.

Figure 12F:
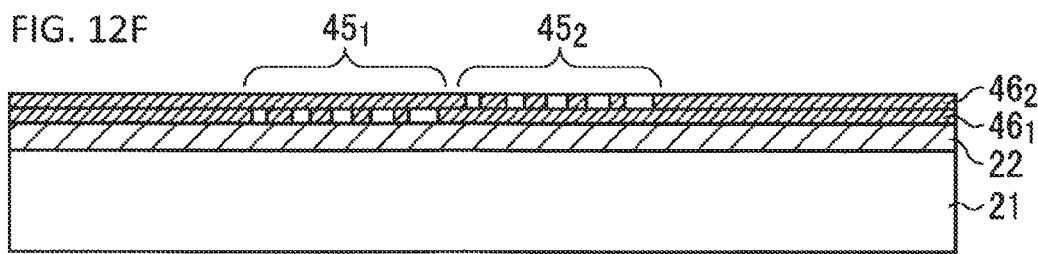

Next, as illustrated in FIG. 12F, a low refractive index layer $46_2$ made of an $SiO_2$ film is provided so as to cover the grating $45_2$ after the patterned resist $44_2$ has been removed. Subsequently, flattening is carried out in accordance with a CMP method. Though the top of the grating $45_2$ is exposed in the figure, the low refractive index layer $46_2$ may remain covering the top.

Figure 13G:
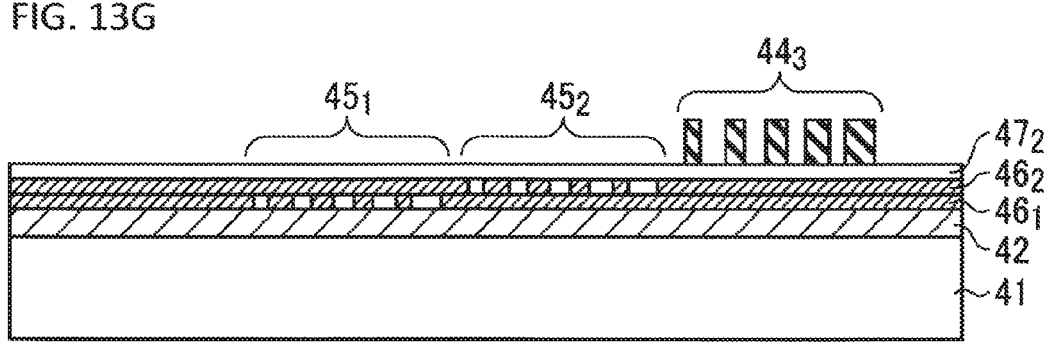
FIGS. 13G through 13I are diagrams illustrating the grating coupler according to Example 2 of the present invention up to a certain step after the step in FIG. 12F during the manufacturing process.
Figure 13H:
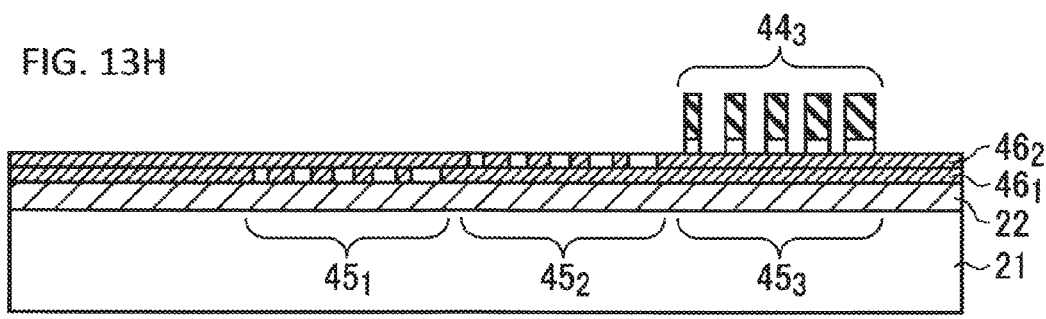

Next, as illustrated in FIG. 13G, a polycrystalline Si layer $47_2$ having a thickness of 0.1 μm to 0.5 μm is deposited so as to cover the grating $45_2$, and after that, a patterned resist $44_3$ for another set is provided so as to correspond to the third section. Here, the patterned resist $44_3$ is located in a place different from the patterned resist $44_1$ but has the same pattern as the patterned resist $44_1$. Subsequently, as illustrated in FIG. 13H, the patterned resist $44_3$ is used as a mask for dry etching so as to form a grating $45_3$.

Figure 13I:
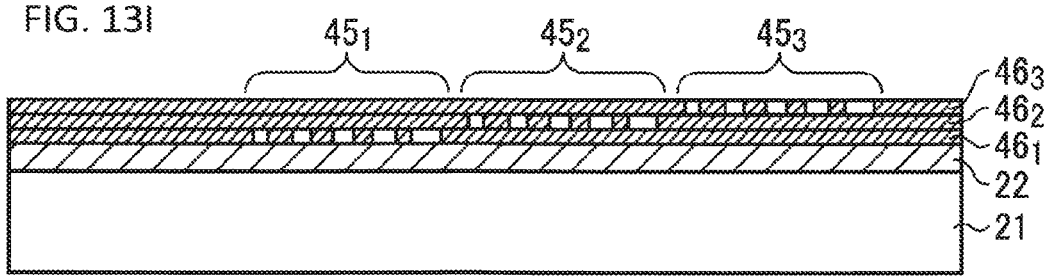
Figure 14J:
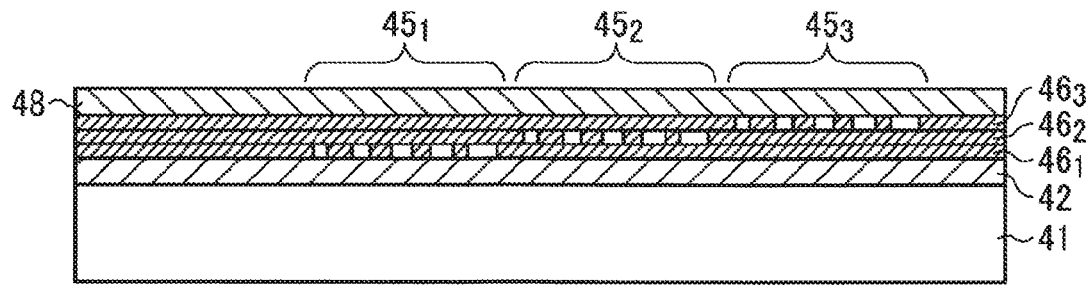
FIGS. 14J through 14L are diagrams illustrating the grating coupler according to Example 2 of the present invention in the steps after the step in FIG. 13I during the manufacturing process.

Next, as illustrated in FIG. 13I, the patterned resist $44_3$ is removed, and then, a low refractive index layer $46_3$ made of an $SiO_2$ film is provided so as to cover the grating $45_3$. Subsequently, flattening is carried out in accordance with a CMP method. Though the top of the grating $45_3$ is exposed in the figure, the low refractive index layer $46_3$ may remain covering the top. Next, as illustrated in FIG. 14J, an SiON film is formed on the entirety of the surface, and then, polishing for flattening is carried out in accordance with a CMP method so that the thickness becomes 1 μm, and thus, a core layer 48 is formed.

Figure 14K:
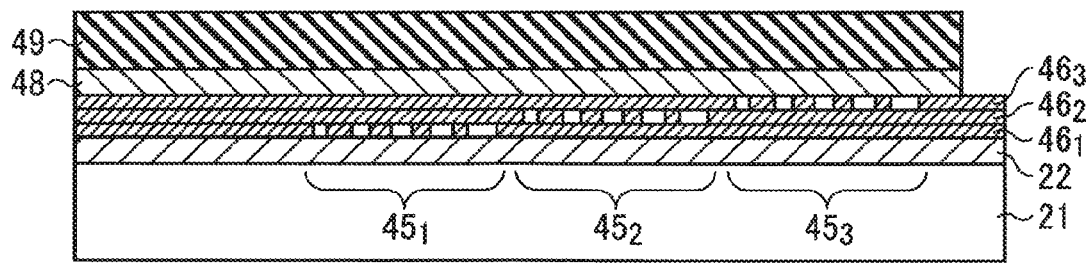
Figure 14L:
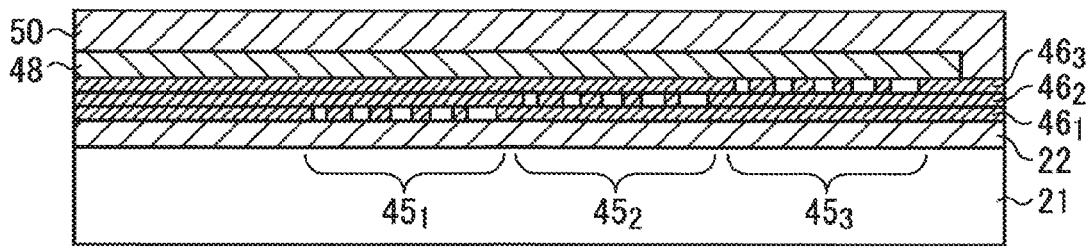

Next, as illustrated in FIG. 14K, a patterned resist 49 patterned in a core form is formed, and the patterned resist 49 is used as a mask to pattern the core layer 48 in a predetermined form. Subsequently, as illustrated in FIG. 14L, an $SiO_2$ film is deposited on the entirety of the surface after the patterned resist 49 has been removed, and then, polishing for flattening is carried out so as to provide an upper clad layer 50, and thus, the basic structure of the grating coupler according to Example 2 of the present invention is complete.

In the same manner as in the case of Example 1, the application of Example 2 of the present invention makes it easy to implement a grating coupler that radiates a Gaussian beam. In particular, a Gaussian beam with high precision can be gained even when using general purpose exposure equipment with regards to precision or resolution. As a result, highly efficient coupling with an optical fiber can be expected, and a high performance optical waveguide device can be implemented. In addition, the core layer has a uniform thickness, which makes it easy to design the optical properties.

EXAMPLE 3

Figure 15A:
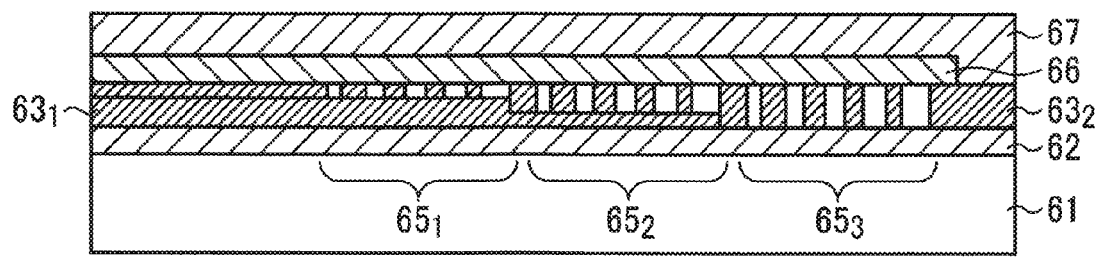
FIGS. 15A through 15D are diagrams illustrating a grating coupler according to Example 3 of the present invention.
Figure 15B:
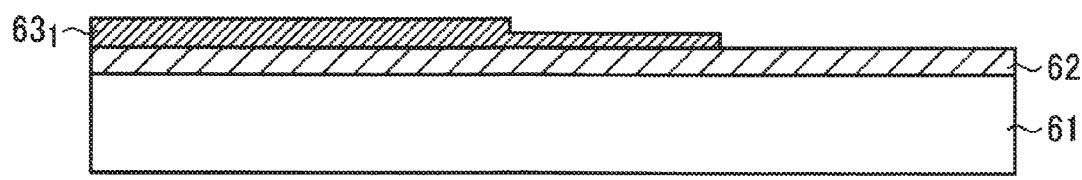
Figure 15C:
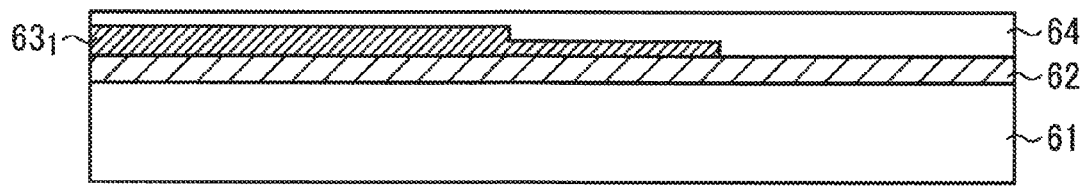
Figure 15D:
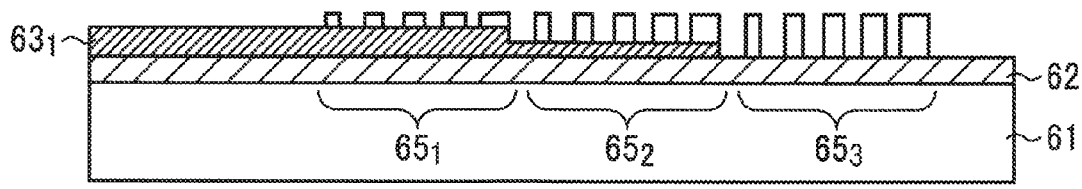

Next, the grating coupler according to Example 3 of the present invention is described in reference to FIGS. 15A through 15D. FIGS. 15A through 15D are diagrams illustrating the grating coupler according to Example 3 of the present invention. FIG. 15A is a cross-sectional diagram illustrating the grating coupler, and FIGS. 15B through 15D are diagrams illustrating the grating coupler in certain steps during the manufacturing process. Here, the process after the formation of the gratings is the same as in Example 1 or Example 2.

As illustrated in FIG. 15A, gratings $65_1$ through $65_3$ made of a polycrystalline Si layer or an $Si_3N_4$ layer that are divided into three sections are provided on a single crystal Si substrate 61 with a lower clad layer 62 made of an $SiO_2$ film in between. The gratings $65_1$ through $65_3$ have different thicknesses for each section due to the insertion of low refractive index layer $46_1$ through $46_3$ in such a manner that the distance between the core layer 66 and the bottom of the gratings $65_1$ through $65_3$ gradually increases as the location gets closer to the terminal of the grating coupler so that the diffraction intensity increases. The core layer 66 made of an SiON film is provided so as to make contact with the gratings $65_1$ through $65_3$, and the surface of the core layer 66 is flattened, and then is covered with an upper clad layer 67 made of an $SiO_2$ film.

In order to form this structure, first, as illustrated in FIG. 15B, a low refractive index layer $63_1$ made of an $SiO_2$ film is provided on a lower clad layer 62, and after that, etching is carried out in three steps so as to correspond to the three sections in the same manner as in Example 1. Subsequently, as illustrated in FIG. 15C, a polycrystalline Si layer 64 is deposited, and then, polishing for flattening is carried out. Next, as illustrated in FIG. 15D, the polycrystalline Si layer 64 is etched so that gratings $65_1$ through $65_3$ having different thicknesses for each section are formed.

After that, though not shown, a low refractive index layer $63_2$ made of an $SiO_2$ film is deposited on the entirety of the surface, and after that, polishing for flattening is carried out so that the top of the gratings $65_1$ through $65_3$ is exposed. After that, in the same manner as in Example 2, a core layer 66 made of an SiON film is formed, and then is patterned in a predetermined form, and after that, an upper clad layer 67 made of an $SiO_2$ film is provided, and thus, the basic structure of the grating coupler according to Example 3 of the present invention is complete.

In Example 3 of the present invention, the thickness of the striped member is changed for each grating so as to adjust the diffraction intensity, and therefore, a grating coupler with a core layer having a uniform thickness can be implemented in a simple manufacturing process. Here, the other working effects are the same as those in Example 1.

EXAMPLE 4

Figure 16A:
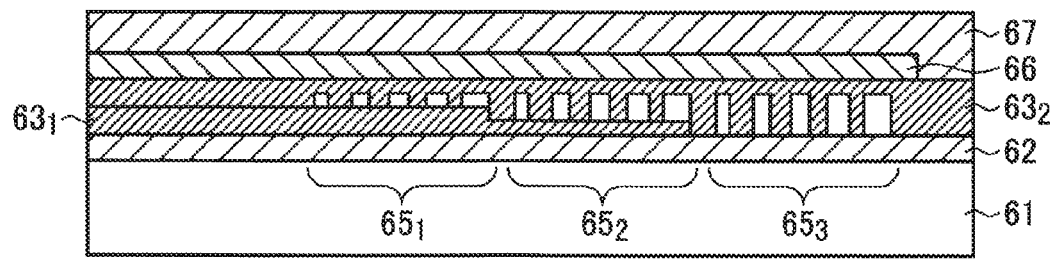
FIGS. 16A through 16D are diagrams illustrating the grating coupler according to Example 4 of the present invention.
Figure 16B:
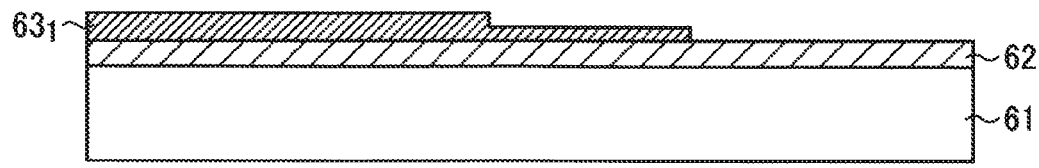
Figure 16C:
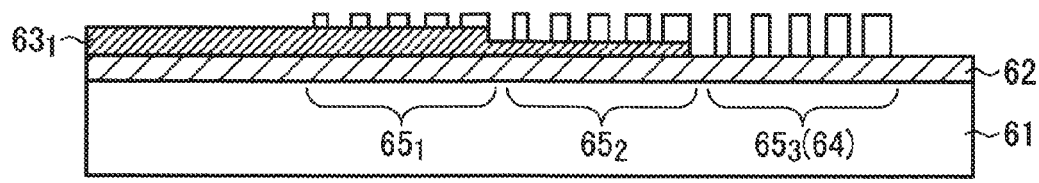
Figure 16D:
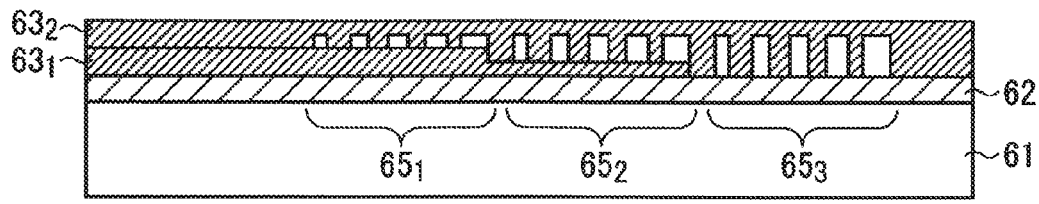

Next, the grating coupler according to Example 4 of the present invention is described in reference to FIGS. 16A through 16D. FIGS. 16A through 16D are diagrams illustrating the grating coupler according to Example 4 of the present invention. FIG. 16A is a cross-sectional diagram illustrating the grating coupler, and FIGS. 16B through 16D are diagrams illustrating the grating coupler in certain steps during the manufacturing process. Here, the basic manufacturing process is the same as that in Example 3.

As illustrated in FIG. 16A, gratings $65_1$ through $65_3$ made of a polycrystalline Si layer or an $Si_3N_4$ layer that are divided into three sections are provided on a single crystal Si substrate 61 with a lower clad layer 62 made of an $SiO_2$ film in between. The gratings $65_1$ through $65_3$ have different thicknesses for each section due to the insertion of low refractive index layer $46_1$ through $46_3$ in such a manner that the distance between the core layer 66 and the bottom of the gratings $65_1$ through $65_3$ gradually increases as the location gets closer to the terminal of the grating coupler so that the diffraction intensity increases. The core layer 66 made of an SiON film is provided so as to make contact with the gratings $65_1$ through $65_3$, and then is patterned in a predetermined form after the surface of the core layer 66 has been flattened, and after that is covered with an upper clad layer 67 made of an $SiO_2$ film. Here, in Example 4, a thin low refractive index layer $63_2$ is made to intervene between the core layer 66 and the top of the gratings $65_1$ through $65_3$.

In order to form this structure, in the same manner as in Example 3 and as illustrated in FIG. 16B, first, a low refractive index layer $63_1$ made of an $SiO_2$ film is provided on a lower clad layer 62, and after that, etching is carried out in three steps so as to correspond to the three sections in the same manner as in Example 1. Subsequently, as illustrated in FIG. 16C, a polycrystalline Si layer 64 is deposited, and then, polishing for flattening is carried out. Next, the polycrystalline Si layer 64 is etched so that gratings $65_1$ through $65_3$ having different thicknesses for each section are formed.

Next, as illustrated in FIG. 16D, a low refractive index layer $63_2$ made of an $SiO_2$ film is deposited on the entirety of the surface, and after that, polishing for flattening is carried out to such a degree that the top of the gratings $65_1$ through $65_3$ is not exposed. After that, in the same manner as in Example 2, a core layer 66 made of an SiON film is formed and then patterned in a predetermined form, and then, an upper clad layer 67 made of an $SiO_2$ film is provided, and thus, the basic structure of the grating coupler according to Example 4 of the present invention is complete.

In Example 4 of the present invention as well, the thickness of the striped member is changed for each grating so as to adjust the diffraction intensity, and therefore, a grating coupler with a core layer having a uniform thickness can be implemented in a simple manufacturing process. This structure is effective in the case where the gratings in Example 3 work too intensively. Here, the other working effects are the same as those in Example 1.

EXAMPLE 5

Figure 17A:
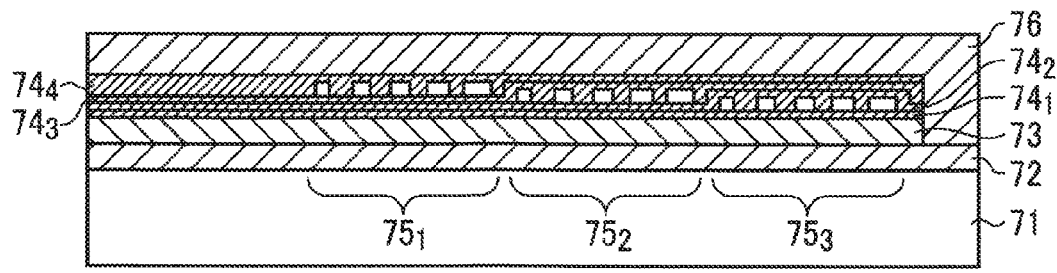
FIGS. 17A through 17D are diagrams illustrating the grating coupler according to Example 5 of the present invention.
Figure 17B:
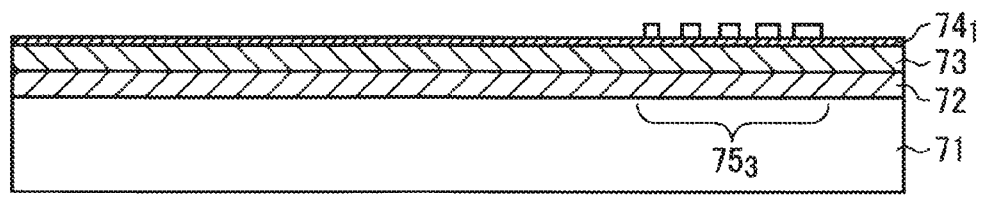
Figure 17C:
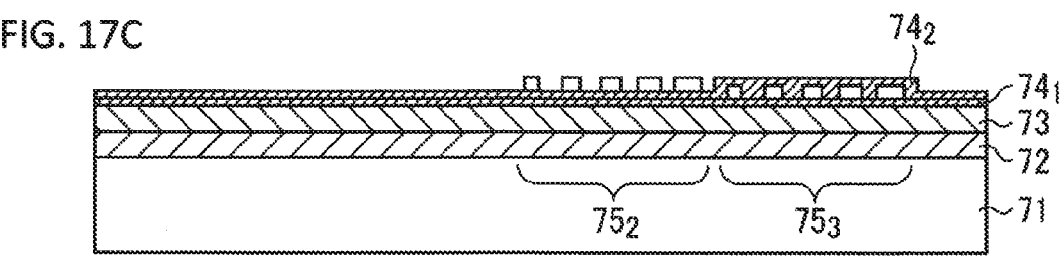
Figure 17D:
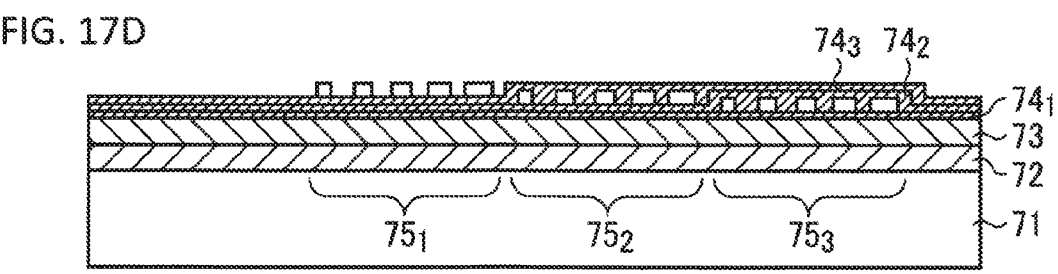

Next, the grating coupler according to Example 5 of the present invention is described in reference to FIGS. 17A through 17D. FIGS. 17A through 17D are diagrams illustrating the grating coupler according to Example 5 of the present invention. FIG. 17A is a cross-sectional diagram illustrating the grating coupler, and FIGS. 17B through 17D are diagrams illustrating the grating coupler in certain steps during the manufacturing process. Here, the grating coupler according to Example 5 has a structure where the gratings are provided on the upper clad layer side in the corresponding structure in Example 2.

As illustrated in FIG. 17A, a core layer 73 made of an SiON film is provided on a single crystal Si substrate 71 with a lower clad layer 72 made of an $SiO_2$ film in between. Gratings $75_1$ through $75_3$ made of a polycrystalline Si layer or an $Si_3N_4$ layer that are divided into three sections are provided on the core layer 73. The distance between the core layer 73 and the top of the gratings $75_1$ through $75_3$ for each section gradually decreases as the location gets closer to the terminal of the grating coupler due to the insertion of low refractive index layers $74_1$ through $74_3$ made of $SiO_2$ films so that the diffractive intensities of the gratings $75_1$ through $75_3$ increase.

In order to form this structure, first, as illustrated in FIG. 17B, a core layer 73 made of an SiON film is provided on a lower clad layer 72, and a polycrystalline Si layer is provided on top of that with a low refractive index layer $74_1$ made of an $SiO_2$ film in between. Next, the polycrystalline Si layer is etched so as to form a grating $75_3$ that corresponds to the third section.

Next, as illustrated in FIG. 17C, a low refractive index layer $74_2$ made of an $SiO_2$ film and a polycrystalline Si layer are deposited, and then, the polycrystalline Si layer is etched so as to form a grating $75_2$ that corresponds to the second section. Subsequently, as illustrated in FIG. 17D, a low refractive index layer $74_3$ made of an $SiO_2$ film and a polycrystalline Si layer are deposited, and then, the polycrystalline Si layer is etched so as to form a grating $75_1$ that corresponds to the first section.

After that, though not shown, a low refractive index layer $74_4$ made of an $SiO_2$ film is provided, and then, the core layer 73 including the gratings $75_1$ through $75_3$ is patterned in a predetermined form. Subsequently, an upper clad layer 76 made of an $SiO_2$ film is provided, and thus, the basic structure of the grating coupler according to Example 5 of the present invention is complete.

In Example 5 of the present invention, the gratings are provided on the upper clad layer side, and the same working effects as those in Example 2 can be gained.

EXAMPLE 6

Figure 18:
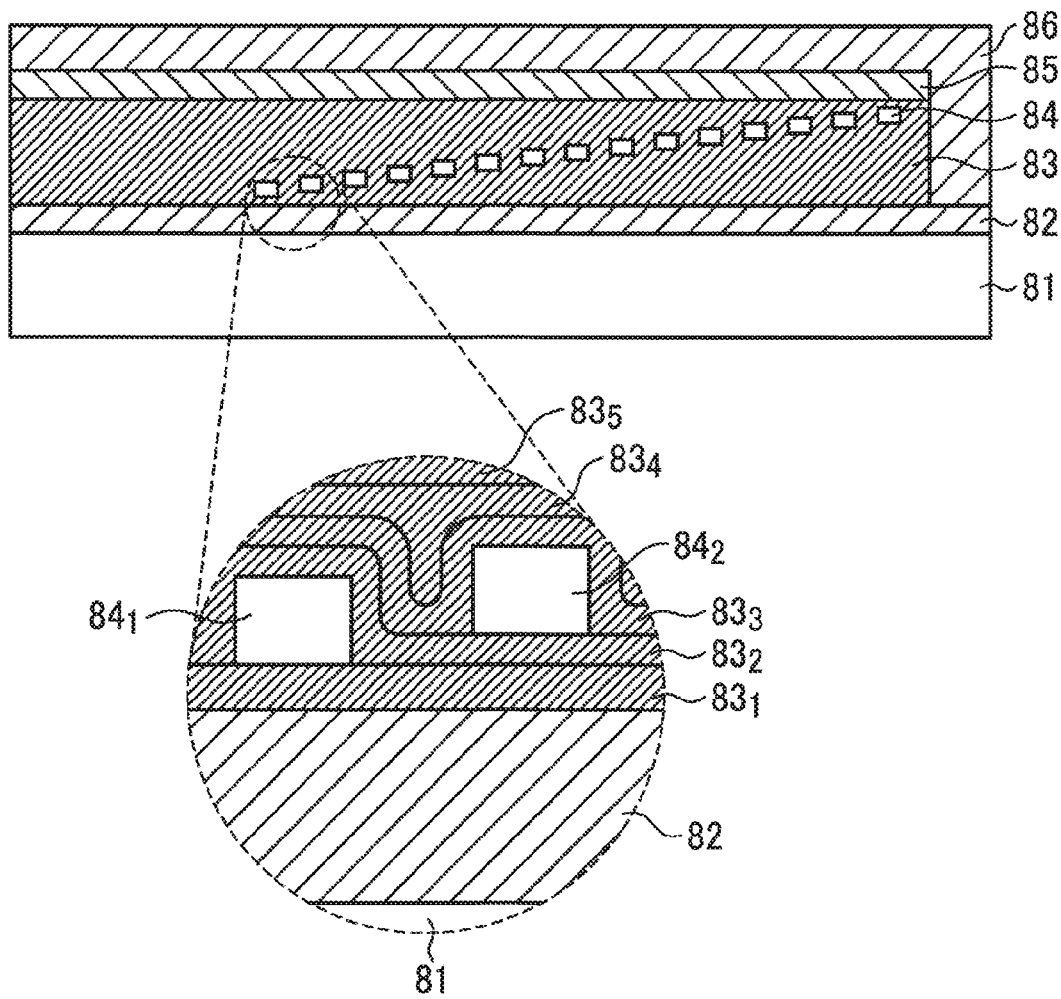
FIG. 18 is a diagram illustrating the grating coupler according to Example 6 of the present invention.
Figure 19A:
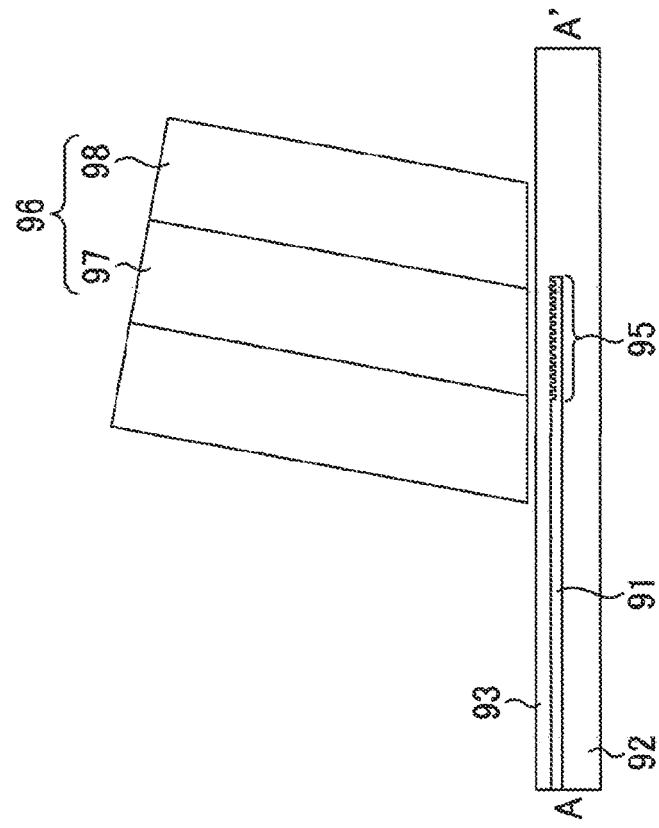
FIGS. 19A and 19B are diagrams illustrating a conventional coupling state between an optical fiber and a grating coupler.
Figure 19B:
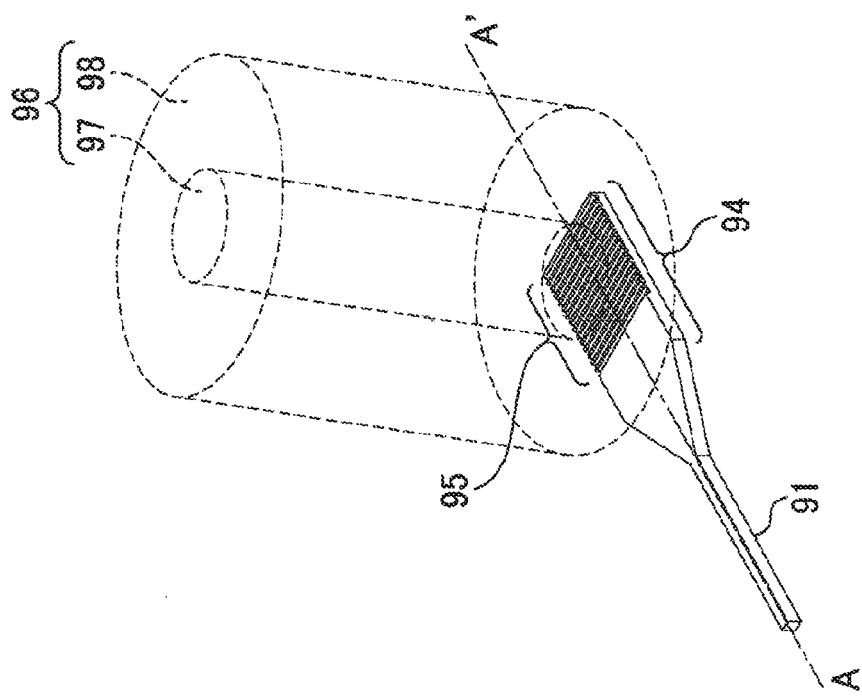
Figure 20:
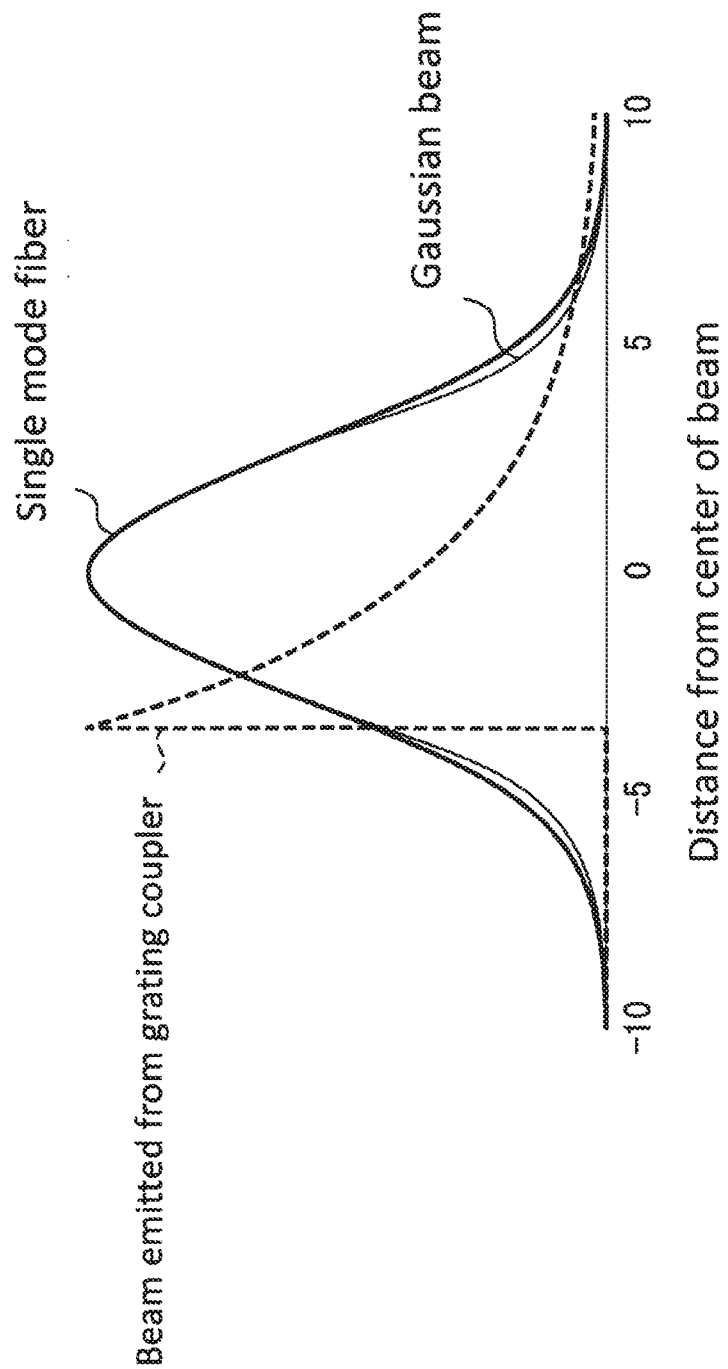
FIG. 20 is a graph illustrating the forms of beams radiated from a grating coupler.

Next, the grating coupler according to Example 6 of the present invention is described in reference to FIG. 18. FIG. 18 is a diagram illustrating the grating coupler according to Example 6 of the present invention, where sections are further divided in such a manner that one section has one stripe, and each stripe that forms each grating has the same width and the same thickness.

As illustrated in FIG. 18, gratings 84 made of stripes that are buried in a low refractive index layer 83 are formed on a single crystal Si substrate 81 with a lower clad layer 82 made of an $SiO_2$ film in between. A core layer 85 made of an SiON film is provided on the low refractive index layer 84 that includes the gratings 84 and patterned in a predetermined form, and then is covered with an upper clad layer 86 made of an $SiO_2$ film.

In order to form this structure, as illustrated by the enlarged portion within the dotted circle, a film formation process and an etching process are repeated for one stripe in accordance with the same technique as that in Example 5. That is to say, first, a polycrystalline Si layer is provided on a lower clad layer 82 with a thin low refractive index layer $83_1$ made of an $SiO_2$ film in between. Next, the polycrystalline Si layer is etched so as to form a first grating $84_1$ made of one stripe.

Next, a thin low refractive index layer $83_2$ made of an $SiO_2$ film and a polycrystalline Si layer are deposited, and then, the polycrystalline Si layer is etched so as to form a second grating $84_2$ made of one stripe. This process is repeated the same number of times as the number of stripes so that thin low refractive index layers $83_3$, $83_4$, $83_5$ ... are sequentially layered on the gratings $84_1$ and $84_2$.

In Example 6 of the present invention, stripes having the same width and the same film thickness provide gratings that change step by step, and therefore, it is easy to design optically. The other working effects are the same as those in Example 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A grating coupler, comprising:
   a substrate;
   a first clad layer provided on the substrate;
   a core layer provided on the first clad layer;
   a second clad layer provided on the core layer; and
   a grating provided between the core layer and either the first clad layer or the second clad layer, where a striped member is formed of a material of which the refractive index is different from that of the core layer is divided into a plurality of sections, wherein a distance between the core layer and a surface of the striped member on a side opposite a surface that faces the core layer is different from among the sections, and
   the core layer does not have a striped pattern configured to form the grating.

2. The grating coupler according to claim 1, wherein a low refractive index layer of which the refractive index is lower than that of the core layer is provided between the core layer and the striped member.

3. The grating coupler according to claim 2, wherein the low refractive index layer is made of the same material as that of the clad layer.

4. The grating coupler according to claim 1, wherein
   a number of stripes provided in each section is the same,
   the distance between the core layer and the surface of the striped member on the side opposite the surface that faces the core layer decreases section by section sequentially as the location gets closer to an end portion of the grating coupler, and
   a size of the stripes in a direction in which light is guided in each section increases sequentially as the location gets closer to the end portion.

5. The grating coupler according to claim 4, wherein the surface of the core layer that faces the striped member is a flat uniform surface.

6. The grating coupler according to claim 4, wherein the surface of the core layer that faces the striped member is a stepped surface that provides different thicknesses of the core layer for each section.

7. The grating coupler according to claim 4, wherein the number of stripes in each section is one, and a thickness and the size in the direction in which light is guided are the same for all the stripes.

8. The grating coupler according to claim 1, wherein the grating is provided between the core layer and the second clad layer.

9. The grating coupler according to claim 1, wherein
   a number of stripes provided in each section is the same,
   the distance between the core layer and the surface of the striped member on the side opposite the surface that faces the core layer increases section by section sequentially as the location gets closer to the an end portion of the grating coupler, and
   a size of the stripes and a thickness of the stripes in the direction in which light is guided in each section increase sequentially as the location gets closer to the end portion.

10. The grating coupler according to claim 1, wherein a number of sections of the striped member is two to four.

11. An optical waveguide device, comprising:
   the grating coupler according to claim 1;
   an optical fiber configured to couple with the grating in an end portion of the grating coupler optically; and
   an optical waveguide configured to extend in the direction opposite the end portion of the grating coupler.

* * * * *